US007921371B1

(12) United States Patent
Roubtsov et al.

(10) Patent No.: US 7,921,371 B1
(45) Date of Patent: Apr. 5, 2011

(54) SYSTEM AND METHOD OF INTERACTIVE, MULTI-OBJECTIVE VISUALIZATION

(75) Inventors: Vladimir Roubtsov, Dripping Springs, TX (US); Abhiman Chatra, Karnataka (IN); Asif Ahmed Sheikh, New York, NY (US)

(73) Assignee: Versata Development Group, Inc., Austin, TX (US)

( * ) Notice: Subject to any disclaimer, the term of this patent is extended or adjusted under 35 U.S.C. 154(b) by 336 days.

(21) Appl. No.: 11/689,984

(22) Filed: Mar. 22, 2007

Related U.S. Application Data

(60) Provisional application No. 60/784,910, filed on Mar. 22, 2006.

(51) Int. Cl.
*G06F 3/048* (2006.01)
(52) U.S. Cl. ........................................ 715/764; 715/215
(58) Field of Classification Search .................. 715/764, 715/215; 345/440
See application file for complete search history.

(56) References Cited

U.S. PATENT DOCUMENTS

| 6,671,680 | B1 * | 12/2003 | Iwamoto et al. ................ 707/3 |
| 7,379,206 | B2 * | 5/2008 | Gartstein et al. ............. 358/1.9 |
| 7,408,551 | B1 * | 8/2008 | Kazmer et al. ................ 345/440 |
| 7,469,228 | B2 * | 12/2008 | Bonissone et al. .......... 705/36 R |
| 2003/0014379 | A1 * | 1/2003 | Saias et al. ..................... 706/45 |
| 2004/0049414 | A1 * | 3/2004 | Gibson et al. .................... 705/7 |
| 2004/0111679 | A1 * | 6/2004 | Subasic et al. .................. 716/1 |
| 2004/0186668 | A1 * | 9/2004 | Gillet et al. .................... 702/19 |
| 2006/0033989 | A1 * | 2/2006 | Chugh et al. ................. 359/385 |
| 2006/0136282 | A1 * | 6/2006 | Furin et al. ..................... 705/10 |

FOREIGN PATENT DOCUMENTS

JP  07282277 A  * 10/1995

OTHER PUBLICATIONS

"Pareto Optimal Solutions Visualization Techniques for Multiobjective Design and Upgrade of Instrumentation Networks", by Bagajewicz et al., published 2003, pp. 5195-5203.*
Hanan Samet, The Quadtree and Related Hierarchical Data Structures, Computing Surveys, vol. 16, No. 2, Jun. 1984, 74 pages.

* cited by examiner

*Primary Examiner* — William L Bashore
*Assistant Examiner* — Gregory A Distefano
(74) *Attorney, Agent, or Firm* — Hamilton & Terrile, LLP; Kent B. Chambers

(57) ABSTRACT

A system and method of multi-objective visualization utilize a multiple-objective optimizer approach to multi-objective optimization and specifically utilize a method for exploring and visualizing Pareto surfaces for any number of dimensions using an interactive graphical user interface. The general solution is to maintain all natural problem objectives separately and use a special multiple-objective optimizer to solve the problem. In this case there is no single solution point. Rather, the solution is a hyper dimensional surface in an objective space with various surface points representing different tradeoffs between objectives.

15 Claims, 10 Drawing Sheets

SYSTEM AND METHOD OF INTERACTIVE, MULTI-OBJECTIVE VISUALIZATION

CROSS-REFERENCE TO RELATED APPLICATION

This application claims the benefit under 35 U.S.C. §119(e) and 37 C.F.R. §1.78 of U.S. Provisional Application No. 60/784,910, filed Mar. 22, 2006 and entitled "System and Method of Interactive, Multi-Objective Visualization", which is incorporated by reference in its entirety.

BACKGROUND OF THE INVENTION

1. Field of the Invention

The present invention relates in general to the field of information processing, and more specifically to a system and method of interactive, multi-objective visualization.

2. Description of the Related Art

Many practical optimization problems involve more than one optimization objective function. It is also a common case that such multiple optimization objectives compete. For example, designing an automobile may involve simultaneous optimization of its acceleration capability (e.g., time to reach the speed of 60 miles/hour from zero initial speed) and fuel economy (e.g., average number of miles that can be covered with a gallon of fuel in a typical highway driving scenario). It is generally impossible to simultaneously achieve the highest acceleration and the best possible fuel economy in the same design: the two objectives are said to be in a "tradeoff" with respect to each other.

There are two schools of thought on how to deal with multiple optimization objectives mathematically:

1. Reduce the problem to the single-objective case by "folding" all problem objectives into a single new objective function, for example, by linearly mixing all original objectives with coefficients that are to be interpreted as "importance weights". The advantage of this approach is that the existing machinery for single objective optimization can be readily applied and it will result in a single solution point for the end user. Disadvantages include the fact that neither the new "mix-in" objective nor the importance weights have any intuitive interpretations. Furthermore, if some of the original objectives have failed to reach desirable values at the solution point (say, due to intrinsic tradeoffs), exploring solution alternatives by varying the importance weights could be a very cumbersome trial-and-error procedure.
2. Maintain all natural problem objectives separately and use a special multiple-objective optimizer (MOP) to solve the problem.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The interrelationship between multiple functions can be very difficult to grasp or mentally conceptualize especially as the number of functions increases. In addition to the volume of information to be comprehended, the interrelationships are not always clear. Functions may be defined using one or more common variables but may not be defined in terms of each other. This increases the difficulty of conceptualization and analysis. For example, the fuel economy may be a function of weight, engine size, tires, frontal surface area, etc. The acceleration of a vehicle may also be a function of weight, engine size, frontal service areas, plus one or more variables that may be different than the variables used to determine fuel economy. It can be difficult to analyze the interrelationship between fuel economy and acceleration functions since these functions are not defined in terms of each other. It becomes a virtually impossible problem for humans to analyze such interrelationships when the functions exceed 4. The system and method of interactive, multi-objective visualization allows a user to visualize the interrelationships between multiple functions and, thus, for example, better understand tradeoffs that need to be made to achieve design goals. In at least one embodiment, the system and method of interactive, multi-objective visualization is a system and method for interactive visualization of multi-dimensional Pareto surfaces and optimization tradeoffs.

Thus, in at least one embodiment, in the multi-objective approach to optimization problems, every solution to a particular optimization problem is a point in the multidimensional space of individual objectives. In general, the full set of such candidate solutions fills a multidimensional solid object representing all possible interactions between various problem objectives. Exploring all such solutions is generally intractable for any problem of realistic size.

Figure 9:
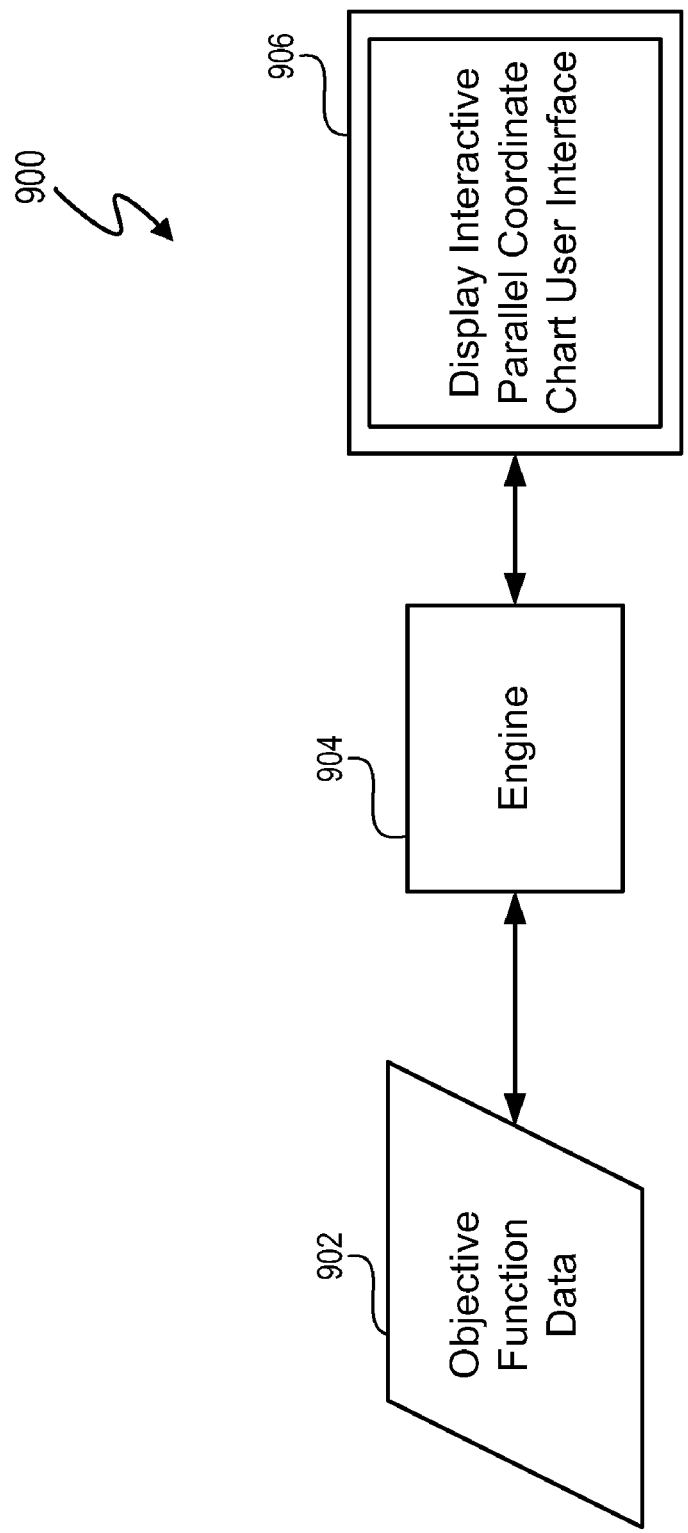
FIG. 9 depicts a system for interactive, multi-objective visualization.

FIG. 9 depicts an exemplary system for interactive, multi-objective visualization 900. For each objective function, the system 900 stores objective function data 902 that, for example, represents the solutions points of the objective for various input values. As described in more detail below, the data can be stored in, for example, database tables or MX Quadtrees. As described in more detail below, an engine, such as a software engine 904, processes the objective function data 902 using, for example, MX Quadtrees processing. The engine 904 generates a user interface having an interactive parallel coordinate chart on display 906. The interactive parallel coordinate chart can be modified pursuant to user inputs as described in more detail below. The software engine 904 can include code stored in a memory and executable by a processor.

Figure 2:
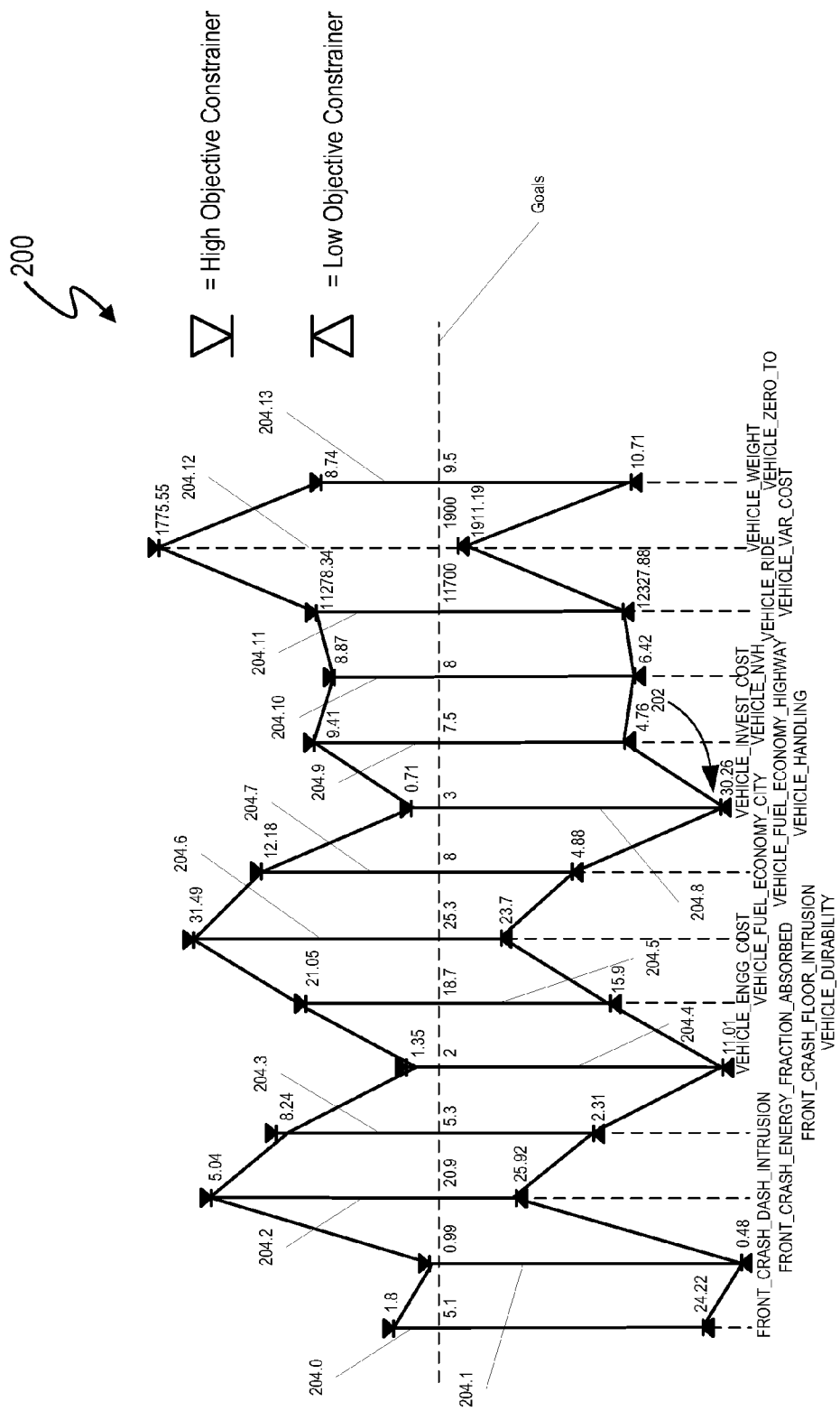
FIGS. 2-7 depict static snapshots of an interactive parallel coordinate chart.
Figure 10:
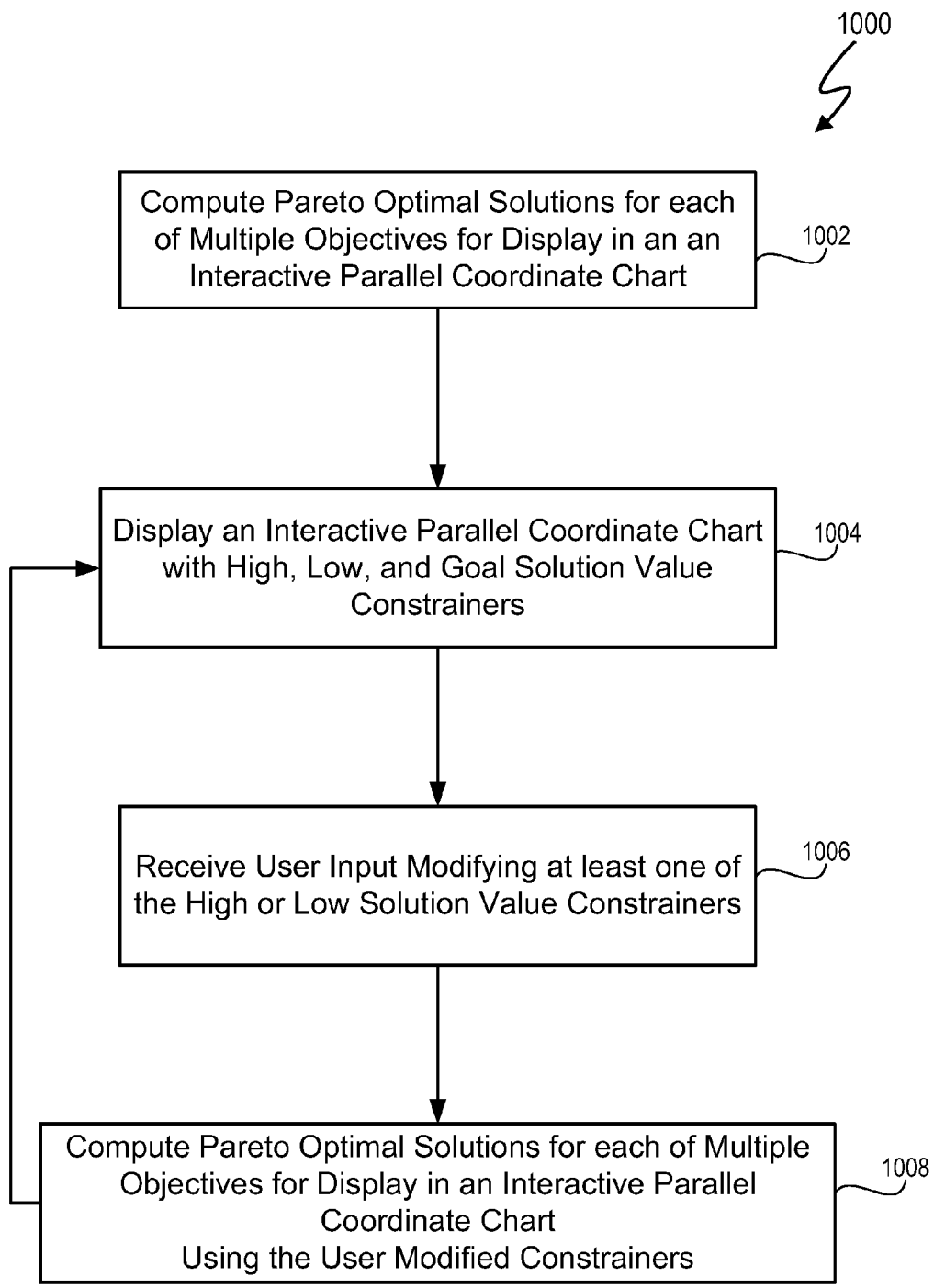
FIG. 10 depicts a method for interactive, multi-objective visualization.

FIG. 10 depicts an exemplary method for interactive, multi-objective visualization 1000. The method 1000 is described in more detail below. Operation 1002 utilizes engine 904 (FIG. 9) to compute Pareto optimal solutions for each of multiple objectives such as objectives 204.0-204.13 (FIG. 2). Operation 1004 displays an interactive parallel coordinate chart with high, low, and goal solution value constrainers as, for example, depicted in FIGS. 2-7. Operation 1006 allows a user to interact with the interactive parallel coordinate chart on display 906. Upon receipt of the user interaction input, operation 1008 computes Pareto optimal solutions for each of multiple objectives for display in an interactive parallel coordinate chart using the user modified constrainers.

Pareto optimality is a concept that allows the end user's attention to be concentrated on a smaller subset of all possible solutions (Pareto optimal solutions), thus making the problem more tractable. Let $\{T_i\}$ be a vector of objective function values (without reducing generality, it can be assumed in this embodiment that all objectives need to be minimized), where the subscript indicates a particular objective. Solution $\{T_i\}^*$ is dominated by another solution $\{T_i\}$ if $T_i \leq T_i^*$ for all i and $\{T_i\}$ is not the same solution as $\{T_i\}^*$. In other words, $\{T_i\}$ is strictly better than $\{T_i\}^*$ along at least one dimension.

Pareto surface (or Pareto frontier) is a surface in the objective space that is composed only of non-dominated solution points. In at least one embodiment, by using Pareto surface methodology for multi-objective approach to optimization problems, the end user only needs to see solutions on the Pareto surface, since all other solutions are dominated and can be improved on. Furthermore, selecting between any two different Pareto optimal solutions is equivalent to trading off gain in one objective's value to loss in at least one other objective's value.

It is thus seen that exploring the Pareto frontier for a given problem can give the end users valuable insights into interactions and tradeoffs between various competing objectives within the problem formulation.

Figure 1:
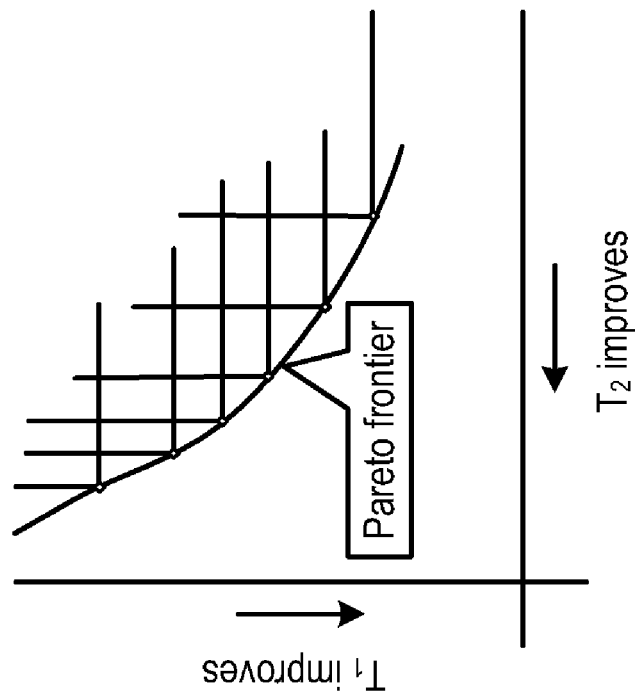
FIG. 1 depicts a Pareto frontier curve with two objectives.
Figure 1:
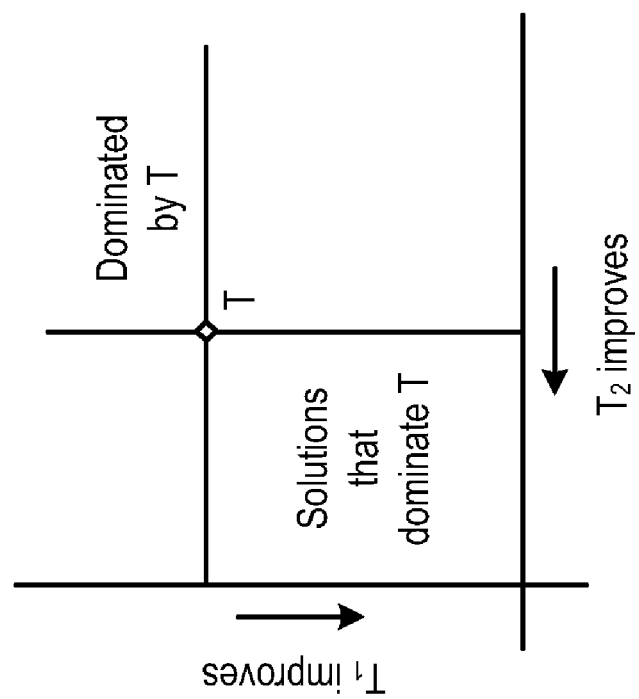

For a problem with just two objectives, its Pareto frontier would be a two-dimensional curve, as shown in FIG. 1.

In at least one embodiment, the present system and method of multi-objective visualization focus on a multiple-objective optimizer (MOP) approach to multi-objective optimization and specifically utilize a method for exploring and visualizing Pareto surfaces for any number of dimensions using an interactive graphical user interface. The general solution is to maintain all natural problem objectives separately and use a special multiple-objective optimizer (MOP) to solve the problem. In this case there is no single solution point. Rather, the solution is a hyper dimensional surface in the objective space ("Pareto surface"), with various surface points representing different tradeoffs between objectives. Calculating this surface is the objective part of the procedure. Choosing the final solution by the end user based on the observed tradeoffs and business intuition is the subjective part of the procedure.

The advantage of this approach is that all objective tradeoffs are made known to the end users very explicitly and can be part of their business decision process. However, doing so requires visualizing a hyper dimensional surface. In situations where the number of competing objectives is four or more, the visualization becomes a challenge since humans generally cannot conceptualize shapes with so many dimensions.

Referring to FIG. 1, tracing various solutions along the curve allows for gaining insight into the best possible tradeoff between solutions $T_1$ and $T_2$. Similarly, for a problem with three objectives its Pareto frontier will be a 3-dimensional surface. However, for dimensionalities greater than three this approach runs into difficulties, because a human brain cannot conceptualize objects in more than three dimensions. This has been MOP's traditional challenge: the Pareto frontier is a very useful concept to work with, but it is hard to visualize for a large class of real-life problems.

The present system and method of multi-objective visualization addresses the above difficulties by doing away with the traditional approach of using static visualizations for Pareto frontiers. By offering the end users an interactive Pareto frontier visualization paradigm it makes at least the following possible:

1. Solutions to MOP problems with more than three objectives can be examined
2. Tradeoffs and mutual sensitivities within any group of objectives can be explored.
3. Exploration of broad ranges of solutions as well as individual solution points is possible.
4. "What-if" scenarios can be tested, whereby the decision maker constrains one or more objective value ranges and observes the effect on the remaining objectives.

The system and method can be useful in a variety of domains where there is a need to support a multi-objective decision process. For example, the above-mentioned case of automobile design is a special case of industrial design, with competing objectives such as cost, performance, weight, etc. Optimization of investment portfolios is usually a case of balancing risk and returns. The system and method make it possible to consider portfolio scenarios with multiple risk metrics at once instead of having to select just one.

System and Method of Visualizing Multi-Objective Functions

In one embodiment, the system and method of interactive, multi-objective functions visualization 900 and 1000 generate an interactive parallel coordinate chart. FIG. 2 is a static snapshot of an embodiment of an interactive parallel coordinate chart 200. The salient features of the interactive parallel coordinate chart 200 are:

Chart 200 shows a subset of a large number of Pareto optimal solutions pre-computed for this problem.

There are 14 objective axes 204.0-204.13 plotted parallel to each, one for each objective in the problem. Each axis shows objective values in real physical units. The objective axes are:
FRONT_CRASH_DASH_INTRUSION,
FRONT_CRASH_ENERGY_FRACTION_AB-SORBED,
FRONT_CRASH_FLOOR_INTRUSION, VEHICLE_DURABILITY,
VEHICLE_ENGG_COST,
VEHICLE_FUEL_ECONOMY_CITY,
VEHICLE_FUEL_ECOMONY_HIGHWAY,
VEHICLE_HANDLING,
VEHICLE_INVEST_COST,
VEHICLE_NVH,
VEHICLE_RIDE,
VEHICEL_VAR_CAST, VEHICLE_WEIGHT, and
VEHICLE_ZERO_TO The solid black, vertical line on each axis represents the full range of objective values found in the Pareto set for that objective.

For each objective, there is a special value goal value of that objective. If the objective is at the goal value or better, the objective is deemed to have been accomplished. In at least one embodiment, all objective axes are shifted vertically so that their goal values are aligned horizontally, shown with a horizontal dashed line.

The direction of each axis is chosen such that "up" direction on the chart always means better objective value.

The shaded band on each axis represents the [worst, best] range of values found on the Pareto frontier for this objective and for this set of user constraints, as explained below.

The interactive nature of this chart 200 is as follows. Each objective axis has two elements under the end user's control: the low and high range constrainers (seen as small rectangles). At any given moment, the chart 200 shows a hyper-dimensional slice of the overall Pareto frontier that is consistent with the current position of all constrainers on all axes.

Whenever the user moves one of the constrainers, the set of Pareto solutions is re-queried to update the display to show the shaded [worst, best] bands that are consistent with all current value constraints.

In this embodiment, each axis is oriented such that "up" always means better and that axes are aligned on their goal watermark values. Thus, in a scenario where the end user attempts to discover the best possible combination of all axis values, the end user's objective is to determine how to best manipulate axis constrainers to coerce as many shaded bands to show above the goal watermark line as possible.

In general, for a problem with inherent objective tradeoffs it won't be possible to get all "shaded" solutions above the goal line. Recollect that each shaded band only shows the [worst, best] range for a given objective—it is possible that while one objective attains its best value some other objective attains its worst value. To reduce this uncertainty, the end user can constrain axes to examine progressively smaller and smaller regions of the Pareto frontier, perhaps even arriving at a single solution point.

Figure 3:
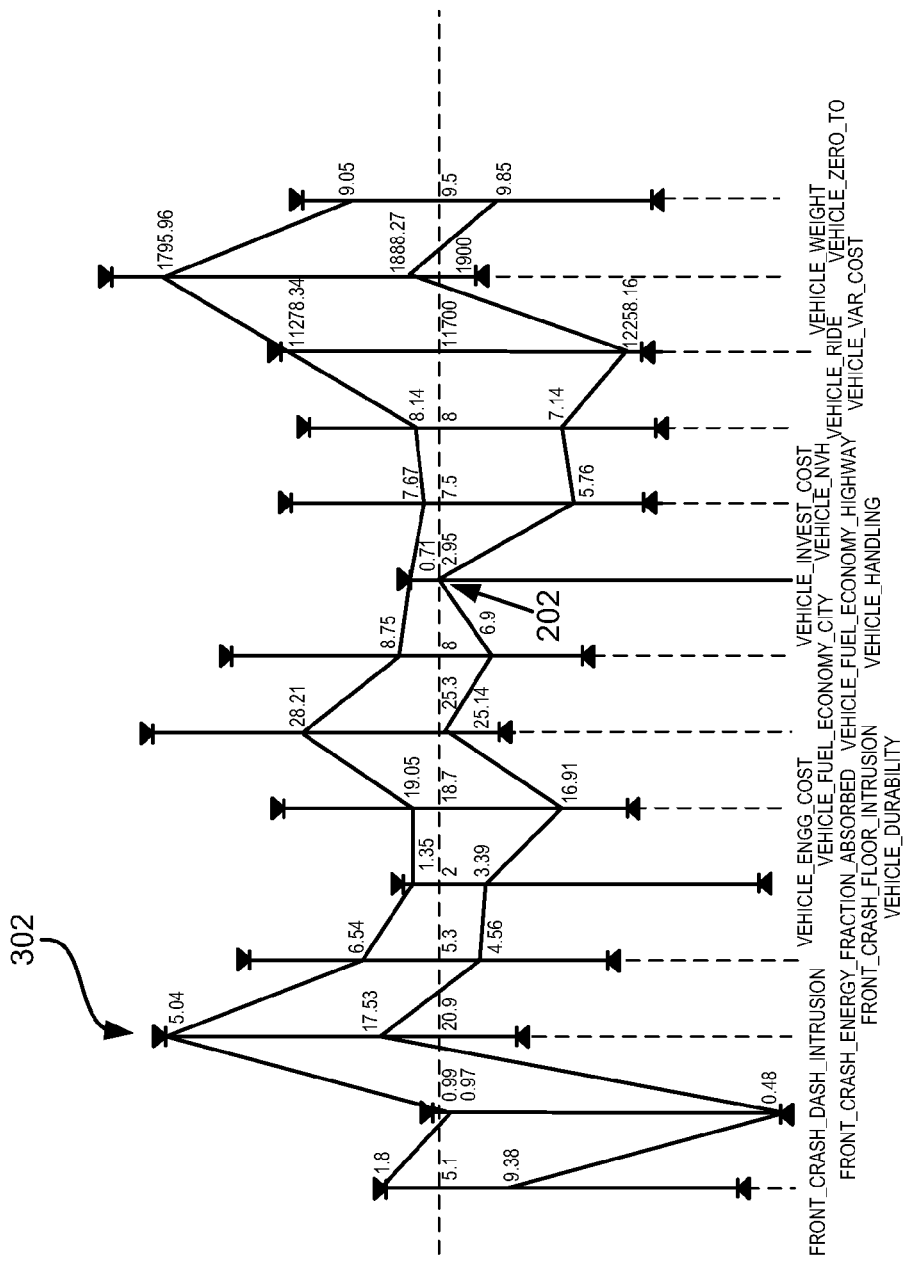

For a possible scenario of what happens in such cases, consider again FIG. 2. The end user is uncomfortable with how much of VEHICLE_INVEST_COST objective (function) is showing below the goal watermark. Referring to FIGS. 2 and 3, the user moves the VEHICLE_INVEST_COST constrainer 202 so that the chart shows only the solutions that are on target in terms of this objective. Notice how doing so affected the other objectives. There are fewer Pareto solutions that achieve the goal on VEHICLE_INVEST_COST.

Furthermore, some objectives now look completely unattainable, e.g., FRONT_CRASH_ENERGY_FRACTION_ABSORBED 302. In at least one embodiment, in a real-time environment, the user would have seen the translation of the Pareto frontier for each objective with real-time feedback as the axis constrainers were being dragged. This an example of a tradeoff between two objectives discovered by interacting with the problem's Pareto frontier.

Figure 4:
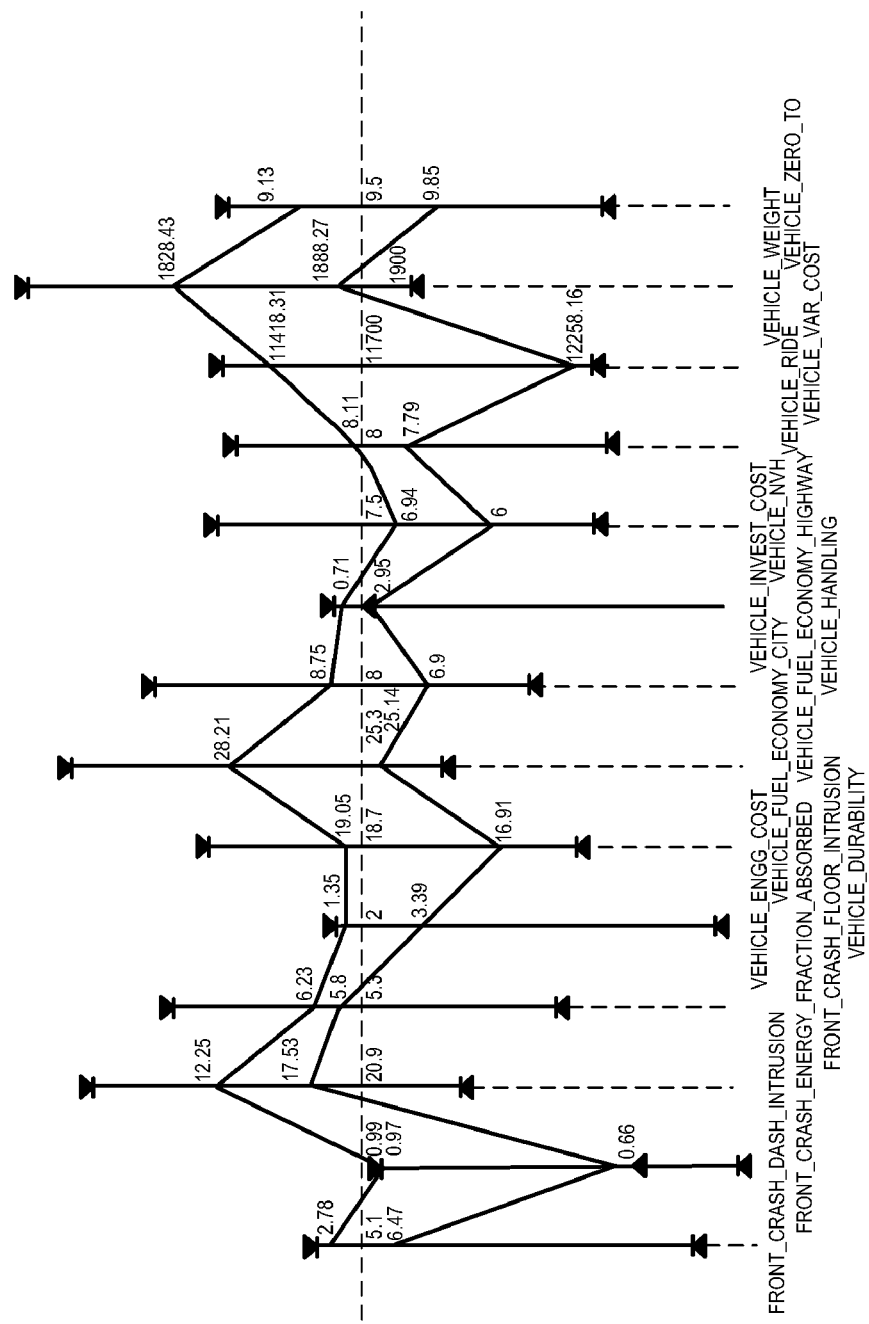
Figure 5:
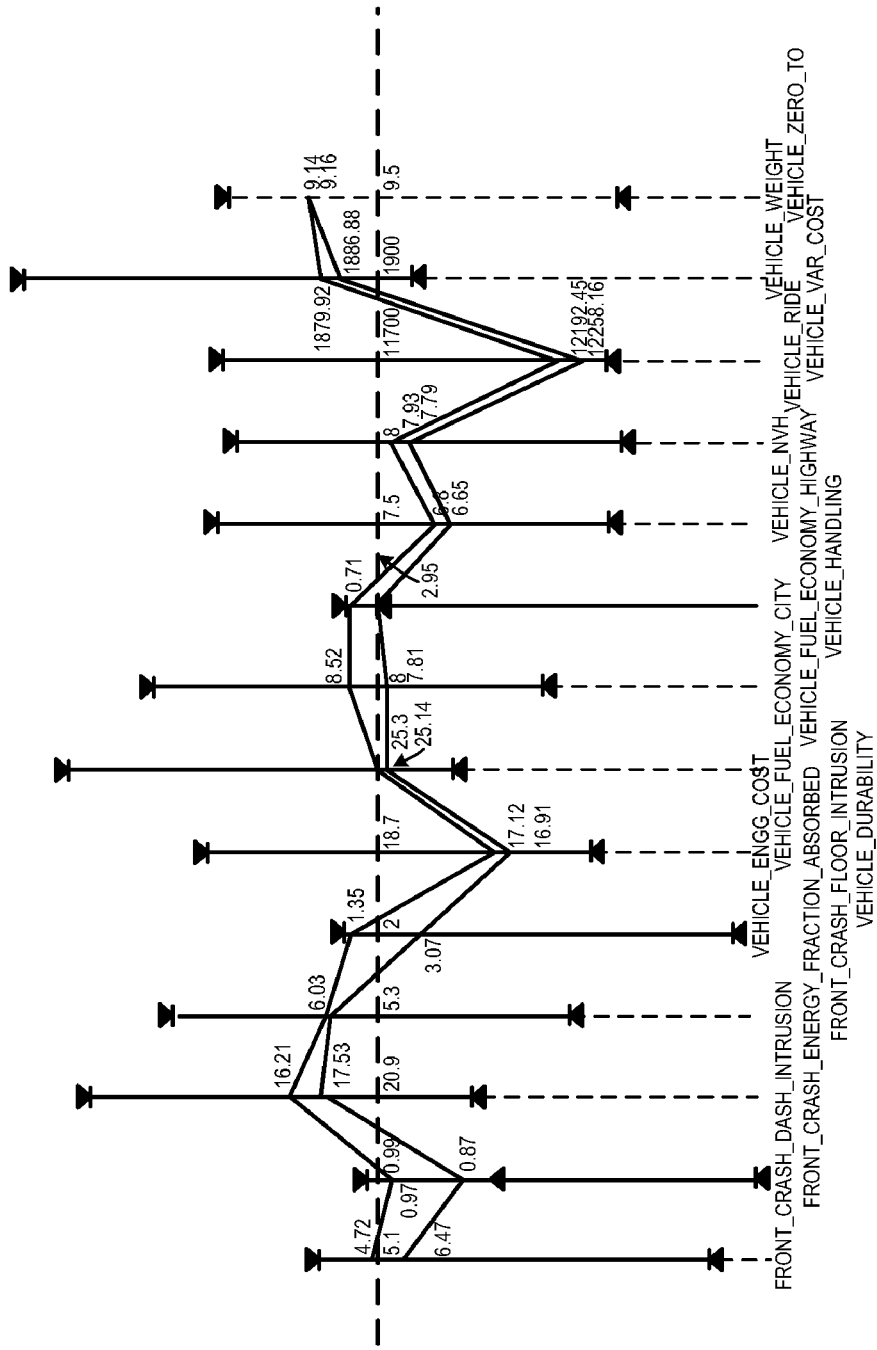

If, for example, the user wants to ensure that the best possible FRONT_CRASH_ENERGY_FRACTION_ABSORBED 302 can be found while maintaining the constraints on VEHICLE_INVEST_COST 200. The user can progressively constrain FRONT_CRASH_ENERGY_FRACTION_ABSORBED 302 from below as depicted in the sequence of FIGS. 3 through 5.

Figure 6:
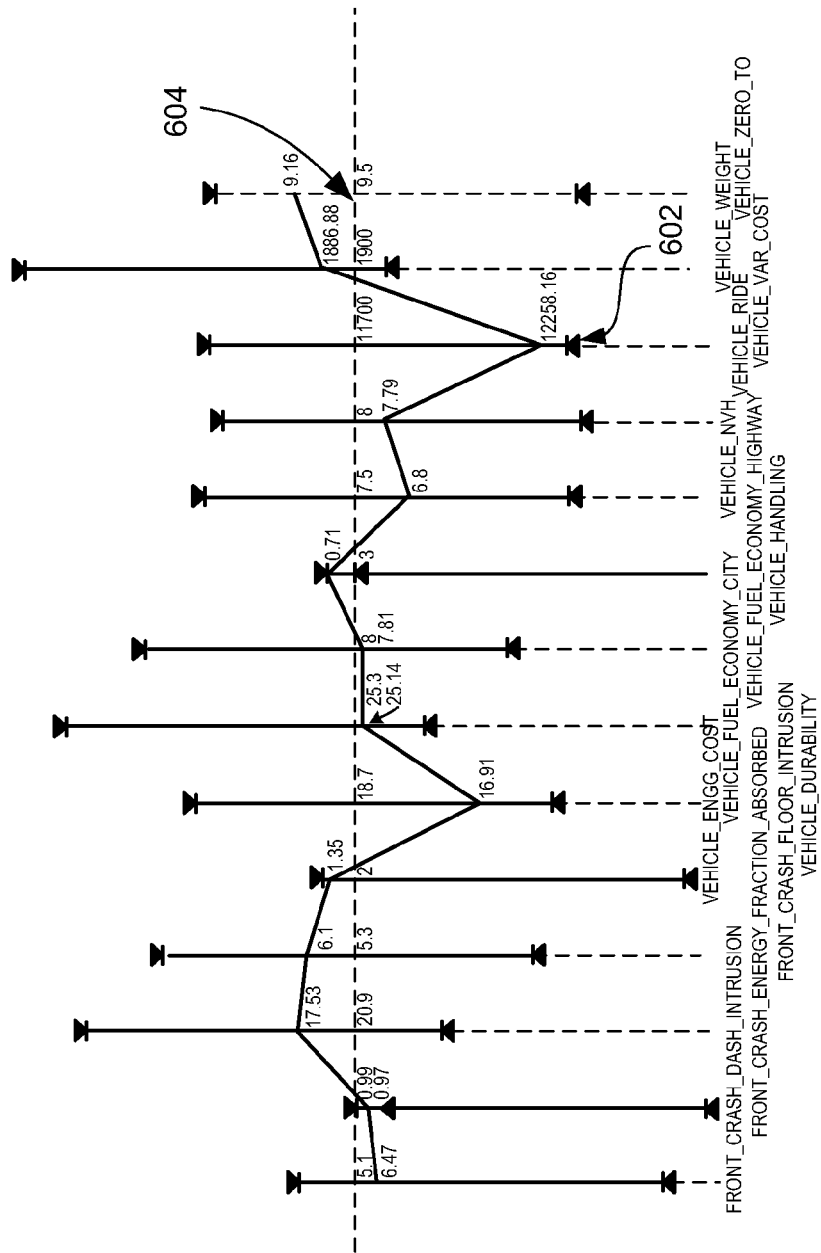

Eventually the end user gets to a single solution point as depicted in FIG. 6. This demonstrates how a possible region of solutions on the Pareto frontier can be reduced down to a single point.

Figure 7:
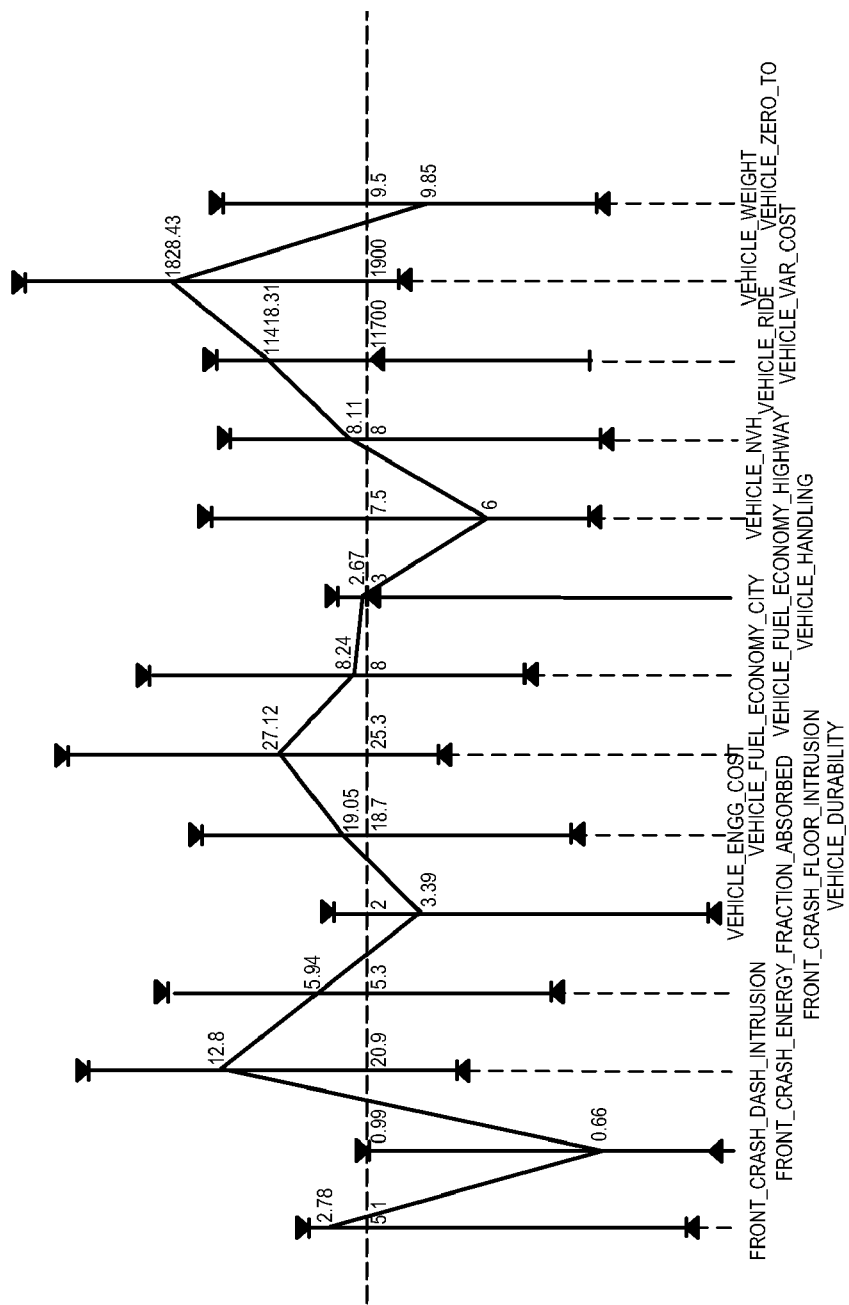

If, however, the user discovers that he is not willing to lose (i.e. below win/lose indication 604) on, for example, VEHICLE_VAR_COST 602 as happened above, the user can instead choose to constrain VEHICLE_VAR_COST 602 axis from below and arrive at a different solution point representing a different combination of tradeoffs between all objectives as shown in FIG. 7.

Such interactive exploration of several solution scenarios provides the end user with intuition about which objectives are in strong tradeoff relationships with each other. With a static visualization alternative, gaining the same amount of insight into problem tradeoffs would have required a prohibitively large number of two- or three-dimensional hyper plane cuts of the Pareto frontier for various combinations of objectives.

The data to support the system and method for interactive visualization of multi-dimensional Pareto surfaces and optimization tradeoffs can be implemented in a database. For example, a database table (or relational tables) could include sample values of each corresponding objective, and software engine 904 could retrieve the data, determine the data boundaries for each objective corresponding to a manipulated objective, and plot the shaded regions. An example database table 1 for objectives A, B, C, D, and E is set forth below:

TABLE 1

| Database | | | | |
|---|---|---|---|---|
| A | B | C | D | E |
| 0 | −2 | 4 | 4 | −5 |
| 1 | −3 | 0 | 6 | −2 |

Using such database tables, data retrieval, and data processing techniques generally are not preferred for real-time applications. In another embodiment, MX Quadtrees are used to store and process the objective data. An example of MX Quadtrees is set forth in Samet, *The Quadtree and Related Hierarchical Data Structures*, Computing Surveys, Vol. 16, No. 2, June 1984, (Samet) which is incorporated by reference. Section 3.2 of Samet is particularly instructive.

Figure 8:
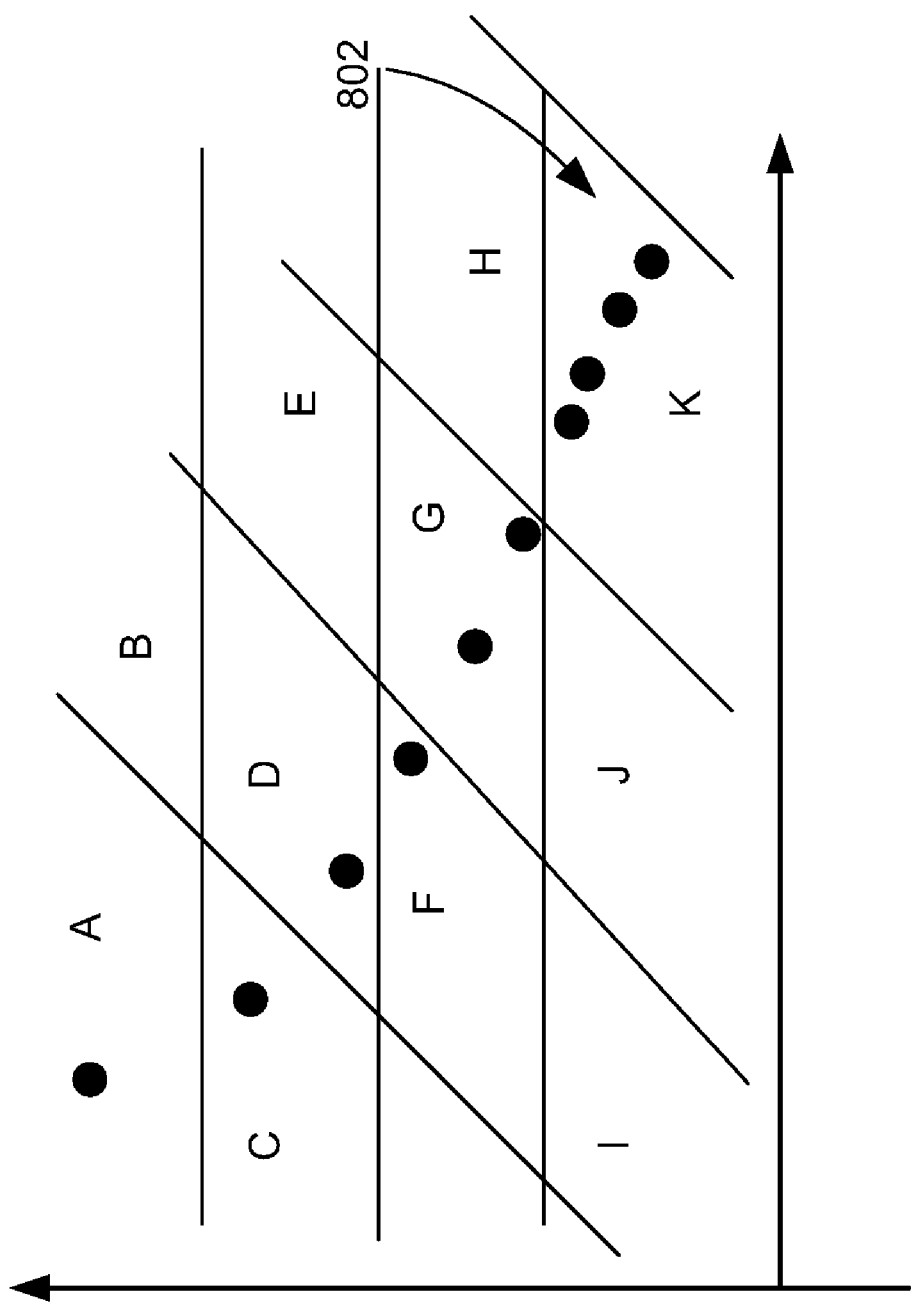
FIG. 8 depicts a chart of data points from multiple functions.

Referring to FIG. 8, when using auto-processing to obtain data points from functions, data can cluster as in cluster 802. To obtain a full range of data, the auto-processing software engine 904 can be constrained to locate data within separate quadrants such as quadrants A-K.

Although the present invention has been described in detail, it should be understood that various changes, substitutions and alterations can be made hereto without departing from the spirit and scope of the invention as defined by the appended claims.

What is claimed is:

1. A method of visualizing and interacting with an interactive parallel coordinate chart representing N objective functions, wherein each objective function is defined by a unique set of variables and at least two of the objective functions include at least one variable in common with another objective function and N is an integer greater than 3, the method comprising:
   computing a set of Pareto optimal solution points for each of the N objective functions;
   displaying the interactive parallel coordinate chart with the set of computed Pareto optimal solutions points for each of the N objective functions, wherein the set of computed Pareto optimal solution points include a high constrainer point and a low constrainer point for each of the N objective functions, the interactive parallel coordinate chart includes N parallel axes, each objective function is associated with one of the parallel axes, and the high and low constrainer points for each objective function are disposed on the parallel axes associated with the objective function;
   receiving user input to vary at least one of the constrainer points of at least one of the N objective functions; and
   modifying the display of the interactive parallel coordinate chart to indicate each constrainer point variation by the user and an effect on the constrainer points of each of the N objective functions.

2. The method of claim 1 wherein the N objective functions comprise functions related to an automobile.

3. The method of claim 2 wherein the N objective functions comprise vehicle weight, vehicle variable cost, vehicle fuel economy highway, vehicle fuel economy city, and vehicle durability.

4. The method of claim 1 wherein displaying the interactive parallel coordinate chart with the set of computed Pareto optimal solutions points for each of the N objective functions further comprises:
  displaying the interactive parallel coordinate chart with the set of computed Pareto optimal solutions points for each of the N objective functions, wherein the solution points fill a multidimensional solid object.

5. The method of claim 1 wherein receiving user input to vary at least one of the constrainer points of at least one of the N objective functions further comprises:
  receiving user input indicating a user is dragging at least one of the constrainer points of at least one of the N objective functions.

6. A system for visualizing and interacting with an interactive parallel coordinate chart representing N objective functions, wherein each objective function is defined by a unique set of variables and at least two of the objective functions include at least one variable in common with another objective function and N is an integer greater than 3, the system comprising:
  an engine to compute a set of Pareto optimal solution points for each of the N objective functions;
  a display to display the interactive parallel coordinate chart with the set of computed Pareto optimal solutions points for each of the N objective functions, wherein the set of computed Pareto optimal solution points include a high constrainer point and a low constrainer point for each of the N objective functions, the interactive parallel coordinate chart includes N parallel axes, each objective function is associated with one of the parallel axes, and the high and low constrainer points for each objective function are disposed on the parallel axes associated with the objective function; and
  wherein the engine is further configured to receive user input to vary at least one of the constrainer points of at least one of the N objective functions and modify the display of the interactive parallel coordinate chart to indicate each constrainer point variation by the user and an effect on the constrainer points of each of the N objective functions.

7. The system of claim 6 wherein the N objective functions comprise functions related to an automobile.

8. The system of claim 7 wherein the N objective functions comprise vehicle weight, vehicle variable cost, vehicle fuel economy highway, vehicle fuel economy city, and vehicle durability.

9. The system of claim 6 wherein the display is further configured to display the interactive parallel coordinate chart with the set of computed Pareto optimal solutions points for each of the N objective functions, wherein the solution points fill a multidimensional solid object.

10. The method of claim 6 wherein the engine is further configured to receive user input indicating a user is dragging at least one of the constrainer points of at least one of the N objective functions.

11. A tangible computer readable medium comprising code encoded thereon and executable by a processor for:
  computing a set of Pareto optimal solution points for each of the N objective functions;
  displaying the interactive parallel coordinate chart with the set of computed Pareto optimal solutions points for each of the N objective functions, wherein the set of computed Pareto optimal solution points include a high constrainer point and a low constrainer point for each of the N objective functions, the interactive parallel coordinate chart includes N parallel axes, each objective function is associated with one of the parallel axes, and the high and low constrainer points for each objective function are disposed on the parallel axes associated with the objective function;
  receiving user input to vary at least one of the constrainer points of at least one of the N objective functions; and
  modifying the display of the interactive parallel coordinate chart to indicate each constrainer point variation by the user and an effect on the constrainer points of each of the N objective functions.

12. The tangible computer readable medium of claim 11 wherein the N objective functions comprise functions related to an automobile.

13. The method of claim 12 wherein the N objective functions comprise vehicle weight, vehicle variable cost, vehicle fuel economy highway, vehicle fuel economy city, and vehicle durability.

14. The tangible computer readable medium of claim 11 wherein the code is further configured and executable by the processor for displaying the interactive parallel coordinate chart with the set of computed Pareto optimal solutions points for each of the N objective functions, wherein the solution points fill a multidimensional solid object.

15. The tangible computer readable medium of claim 11 wherein the code is further configured and executable by the processor receiving user input indicating a user is dragging at least one of the constrainer points of at least one of the N objective functions.

* * * * *